United States Patent
Kumamoto (10) Patent No.: US 7,316,205 B2
(45) Date of Patent: Jan. 8, 2008

(54) STEAM-HEATING APPARATUS

(75) Inventor: Tadaaki Kumamoto, Kakogawa (JP)

(73) Assignee: TLV Co., Ltd., Hyogo-ken (JP)

(*) Notice: Subject to any disclaimer, the term of this patent is extended or adjusted under 35 U.S.C. 154(b) by 0 days.

(21) Appl. No.: 11/257,908

(22) Filed: Oct. 25, 2005

(65) Prior Publication Data

US 2006/0032467 A1    Feb. 16, 2006

Related U.S. Application Data

(62) Division of application No. 10/752,946, filed on Jan. 7, 2004, now Pat. No. 7,017,528, which is a division of application No. 09/936,370, filed as application No. PCT/JP00/08944 on Dec. 15, 2000, now Pat. No. 6,739,288.

(30) Foreign Application Priority Data

| Jan. 14, 2000 | (JP) | ................................. 2000-5447 |
| Jan. 14, 2000 | (JP) | ................................. 2000-5450 |
| Jan. 14, 2000 | (JP) | ................................. 2000-5451 |
| Jan. 14, 2000 | (JP) | ................................. 2000-5455 |
| Aug. 10, 2000 | (JP) | ............................. 2000-242191 |

(51) Int. Cl.
*F24D 19/00* (2006.01)

(52) U.S. Cl. ................. 122/15.1; 122/459; 237/67

(58) Field of Classification Search ............. 122/15.1, 122/359; 237/67, 58, 59; 126/378.1; 165/287, 165/299, 917

See application file for complete search history.

(56) References Cited

U.S. PATENT DOCUMENTS

| 2,954,840 | A | * | 10/1960 | Freneau .................... 122/1 R |
| 5,209,284 | A |   | 5/1993 | Okamoto et al. |
| 6,420,167 | B1 | * | 7/2002 | Okamoto et al. ........ 435/286.6 |
| 6,739,288 | B1 |   | 5/2004 | Kumamoto |

FOREIGN PATENT DOCUMENTS

| JP | 4-180829 | 6/1992 |
| JP | 05-187602 | 7/1993 |
| JP | 7-080284 | 3/1995 |
| JP | 7-328422 | 12/1995 |
| JP | 09-250887 | 9/1997 |
| JP | 11-318543 | 11/1999 |

* cited by examiner

*Primary Examiner*—Jiping Lu
(74) *Attorney, Agent, or Firm*—The Webb Law Firm (57) ABSTRACT

In a steam-heating apparatus in which a heating section formed in a heat exchanger is connected to a steam supply pipe for receiving a supply of heating steam and connected also to a condensate recovering unit for discharging condensate produced as a result of heating, the apparatus includes a steam ejector including a suction chamber connected to the heating section and an inlet for receiving supply of steam. When the temperature of the heating section or between the heating section and the condensate recovering unit is dropped by a predetermined value, steam is supplied from the steam supply pipe to the inlet of the steam ejector, and gas in the heating section is sucked into the suction chamber of the steam ejector.

3 Claims, 7 Drawing Sheets

STEAM-HEATING APPARATUS

CROSS REFERENCE TO RELATED APPLICATIONS

This application is a divisional of U.S. patent application Ser. No. 10/752,946, filed Jan. 7, 2004 now U.S. Pat. No. 7,017,528, entitled "Steam-Heating Apparatus", which is a divisional of U.S. patent application Ser. No. 09/936,370, filed Feb. 12, 2002, now U.S. Pat. No. 6,739,288, which is the national phase of PCT/JP00/08944, filed Dec. 15, 2000.

BACKGROUND OF THE INVENTION

1. Field of the Invention

The present invention relates to a steam-heating apparatus in which a heating section formed in a heat exchanger is connected with a steam supply pipe for receiving a supply of heating steam and connected also with a condensate recovering unit for discharging condensate produced as a result of heating.

2. Background Art

Figure 6:
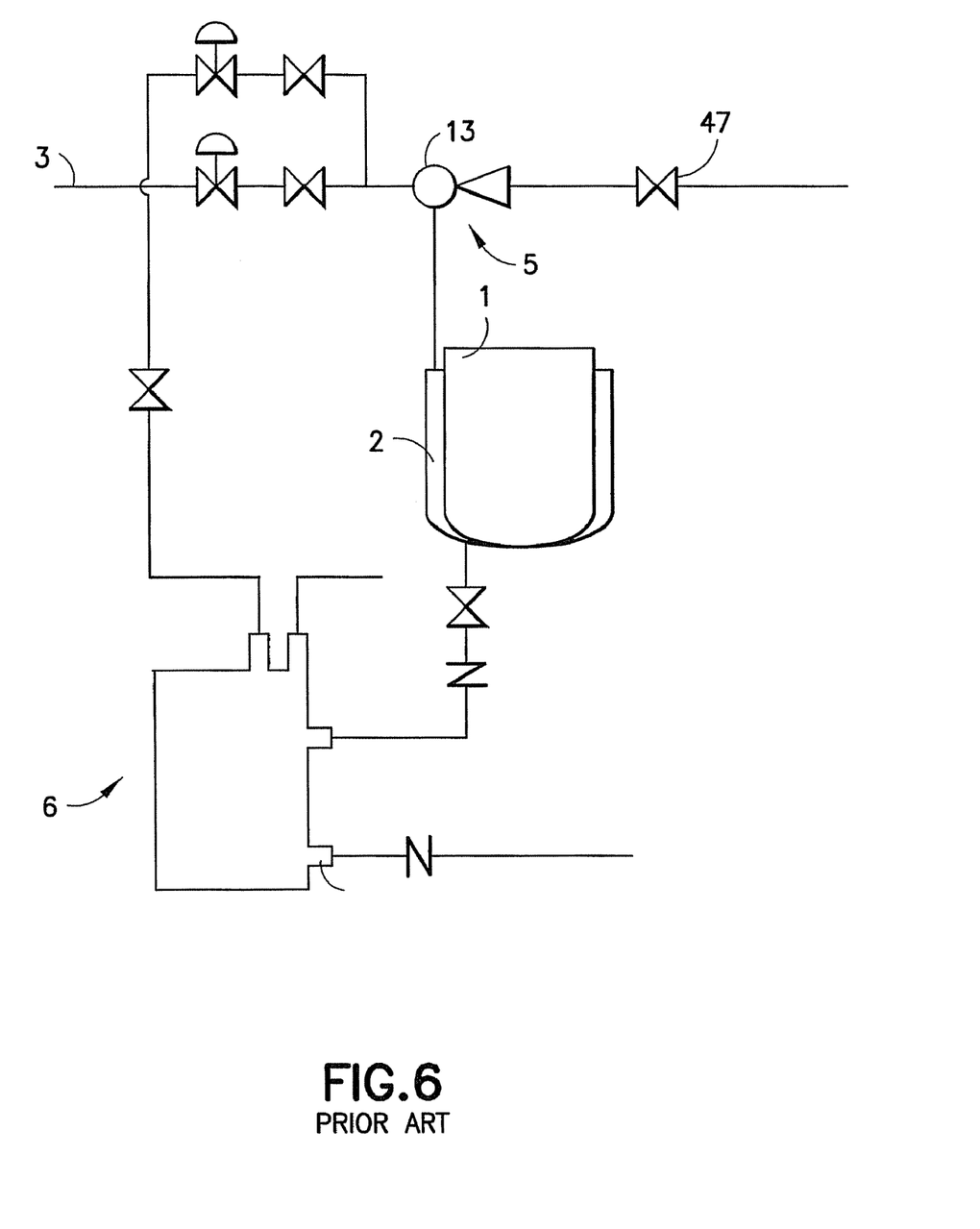
FIG. 6 is a construction view showing a steam-heating apparatus according to the prior art.

An example of such steam-heating apparatus is known from Japanese patent application laid-open No. Hei. 7-328423. In this steam-heating apparatus, as shown in FIG. 6, a reaction vessel 1 is provided as a heat exchanger. The reaction vessel includes, as a heating section thereof, a jacket section 2, to which a steam supply pipe 3 for receiving a supply of heating steam and a condensate recovering unit 6 for discharging condensate produced as a result of heating are connected. More particularly, the steam supply pipe 3 is connected to an inlet of a steam ejector 5 and the jacket section 2 as a heating section is connected to a suction chamber 13 formed in an outer periphery of a nozzle communicated with the inlet of the steam ejector 5. Also, a shutoff valve 47 is connected to an outlet communicated with the suction chamber 13.

In operation, by opening the shutoff valve 47, air remaining within the jacket section 2 will be drawn into the suction chamber 13 to evacuate the inside of the jacket section 2. Thereafter, by closing the shutoff valve 47, low-pressure steam is supplied into the jacket section 2, so that an object in the reaction vessel 1 may be heated by low-temperature steam of 100° C. or lower.

With the conventional steam-heating apparatus described above, the apparatus is capable of steam-heating an object with the air remaining at the initial stage of the heating process being removed by suction. However, this apparatus cannot exhaust air which may be gradually accumulated with progress of the heating process, so that the apparatus becomes unable to maintain a predetermined heating temperature precisely. Specifically, when the heating apparatus is placed under the evacuated condition below the atmospheric pressure, atmospheric air may be inadvertently drawn through in the respective joints of the apparatus, thus leading to gradual accumulation of air inside the heating section. Moreover, the heating steam supplied to the apparatus may contain some air therein. Therefore, disadvantageous accumulation of air inside the heating section occurs not only in the initial stage of the heating process but also during the subsequent heating stage thereof.

DISCLOSURE OF THE INVENTION

Accordingly, an object of the present invention is to provide a steam-heating apparatus capable of adjusting the heating temperature with high precision by effectively eliminating air which may be accumulated not only in the initial stage of the steam-heating process but also during the subsequent heating stage thereof.

For accomplishing the object noted above, a steam-heating apparatus proposed by the present invention comprises a steam ejector including a suction chamber connected to the heating section and an inlet for receiving supply of heating steam, the steam ejector being actuated in response to a drop in a temperature of the heating section by a predetermined value so as to suck air (an example of gas) in the heating section into the suction chamber of the steam ejector.

That is, in response a drop by a predetermined value in the temperature in e.g. the heating section or in a condensate tank disposed between this heating section and the condensate recovering device, the steam ejector is actuated and steam is supplied to the inlet of the steam ejector, whereby a suction force is developed in the suction chamber for sucking the air accumulated in the heating section therein and subsequently exhausting this air to the outside.

Therefore, in the steam-heating apparatus, whenever the temperature of the heating section drops by a predetermined value due to presence of air therein not only in the initial stage of heating, but also during subsequent heating stage thereof, the steam ejector is actuated for sucking and exhausting this air.

Further, in addition to the above-described construction of the steam-heating apparatus, the steam-heating apparatus of the invention may further comprise a temperature-responsive valve disposed at the inlet of the steam ejector, the temperature-responsive valve being opened in response to the drop by the predetermined value of the temperature of the heating section so as to supply the steam to the inlet of the steam ejector.

That is, by providing the temperature-responsive valve connected to the inlet of the steam ejector, when air has accumulated in the heating section to cause the temperature thereof to drop by a predetermined value, the temperature-responsive valve is opened to introduce steam into the inlet of the steam ejector and the air accumulated in the heating section is withdrawn by the resultant suction force developed in the suction chamber to be exhausted to the outside.

In addition to the above-described construction of the steam-heating apparatus, the steam-heating apparatus of the invention may further comprise a check valve disposed at a connection between the heating section and the suction chamber of the steam ejector, the check valve allowing only unidirectional passage of the air from the heating section to the suction chamber of the steam ejector.

That is, by providing the check valve disposed between the suction chamber of the steam ejector and the heating section or the condensate tank in addition to the temperature-responsive valve connected to the inlet of the steam ejector, when the temperature drops by a predetermined value as a result of accumulation of air inside the heating section or the condensate tank, the temperature-responsive valve is opened to supply steam to the inlet of the steam ejector and the check valve is opened by the resultant suction force of the steam ejector to allow communication of air from the heating section to the suction chamber thereby to suck and exhaust the air accumulated inside the heating section to the outside.

Further, the steam-heating apparatus of the present invention, in addition to the above-described construction of the steam-heating apparatus, further comprises a temperature-responsive valve disposed at a connection between the heating section and the suction chamber of the steam ejector, the temperature-responsive valve being opened in response to a drop by a predetermined value in the temperature of the heating section so as to allow suction of the air from the heating section to the suction chamber of the steam ejector.

That is, by providing a temperature-responsive valve disposed at a connection between the heating section and the suction chamber of the steam ejector, when air has accumulated inside the heating section thus causing a drop in its temperature by a predetermined value, the temperature-responsive valve is opened to establish communication between the heating section and the suction chamber of the steam ejector, whereby the air accumulated in the heating section can be sucked and exhausted to the outside by the resultant suction force developed in the suction chamber.

For accomplishing the object of this invention, the steam-heating apparatus of the present invention comprises a condensate tank disposed between the heating section and the condensate recovering unit and a steam ejector having a suction chamber connected to the heating section or to the condensate tank and an inlet for receiving supply of steam, the steam ejector being actuated in response to a drop by a predetermined value in the temperature inside the heating section or the condensate tank so as to suck air in the heating section or the condensate tank into the suction chamber of the steam ejector.

That is, when the temperature inside the heating section or the condensate tank interposed between the heating section and the condensate recovering unit drops by a predetermined value, the steam ejector is actuated to cause the air in the heating section or the condensate tank to be sucked into the suction chamber of the steam ejector. With this, when air has accumulated inside the heating section and the condensate tank resulting in a temperature drop by a predetermined value, the steam ejector is actuated so that steam is supplied to the inlet of the steam ejector from e.g. a steam supply pipe an the resultant suction force developed in the suction chamber can suck the air accumulated inside the heating section and the condensate tank and exhaust the air to the outside.

Accordingly, in the steam-heating apparatus, both in the initial stage of heating and during the subsequent heating stage, whenever air has accumulated inside the heating section or the condensate tank thus resulting in such temperature drop, the steam ejector is actuated to suck and exhaust the air.

Further, the steam-heating apparatus of this invention, in addition to the above-described construction of the steam-heating apparatus, further comprises a temperature-responsive valve disposed at the inlet of the steam ejector, the temperature-responsive valve being opened in response to a drop by a predetermined value in the temperature inside the heating section or the condensate tank so as to supply the steam of the steam supply pipe to the inlet of the steam ejector.

That is to say, in case the steam-heating apparatus includes a condensate tank, there is provided the temperature-responsive valve connected to the inlet of the steam ejector. With this, when air has accumulated inside the heating section or the condensate tank resulting in a temperature drop by a predetermined value, the temperature-responsive valve is opened so as to supply steam to the inlet of the steam ejector and a suction force is developed in the suction chamber. With this, the air accumulated in the heating section and the condensate tank may be sucked into the suction chamber via a check valve or the like provided between the suction chamber of the steam ejector and the condensate tank and the air may be exhausted to the outside subsequently.

Further, the steam-heating apparatus of the present invention, in addition to the above-described construction of the steam-heating apparatus, further comprises a check valve provided at a connection between the heating section or the condensate tank and the suction chamber of the steam ejector, the check valve allowing only unidirectional gas passage from the heating section or the condensate tank to the suction chamber of the steam ejector.

That is, by providing a check valve between the suction chamber of the steam ejector and the heating section or the condensate tank in addition to the temperature-responsive valve connected to the inlet of the steam ejector, when air has accumulated inside the heating section or the condensate tank thus resulting in a drop in its temperature by a predetermined value, the temperature-responsive valve is opened to supply steam to the inlet of the steam ejector and the check valve is opened by the resultant suction force from the steam ejector so as to allow communication of air from the heating section or the condensate tank to the suction chamber, so that the air accumulated inside the heating section or the condensate tank may be sucked and exhausted to the outside by the suction force in the suction chamber.

For accomplishing the object of this invention, with the steam-heating apparatus of the present invention, the condensate recovering unit includes a high-pressure control fluid inlet for receiving supply of high-pressure control fluid for pressure-transporting and discharging the condensate, the apparatus comprises an ejector including a suction chamber connected to the heating section, an inlet for receiving supply of the high-pressure control fluid and an outlet connected to the high-pressure control fluid inlet and further comprises a valve means provided at a connection between the heating section and the suction chamber of the steam ejector.

That is to say, the ejector is incorporated in a high-pressure control fluid passage for passing the high-pressure control fluid; the outlet of the ejector is connected to the high-pressure control fluid inlet of the condensate recovering unit; and the suction chamber of the ejector and the heating section are connected to each other via the valve means comprising e.g. a shutoff valve. In operation, when the high-pressure control fluid is introduced into the condensate recovering unit thereby to pass the high-pressure control fluid through the ejector, a suction force is developed in the suction chamber of the ejector, whereby air accumulated inside the heating section may by sucked and exhausted via the valve means.

Accordingly, both in the initial stage of the heating and the subsequent heating stage, each time the high-pressure control fluid is introduced into the condensate recovering unit, a suction force is developed in the ejector, so that the air accumulated in the heating section may be eliminated.

For accomplishing the object of this invention, with the steam-heating apparatus of the present invention, the condensate recovering unit includes a high-pressure control fluid inlet for receiving supply of high-pressure control fluid for pressure-transporting and exhausting the condensate and a condensate returning outlet for exhausting the pressure-transported condensate, the apparatus comprises an ejector including a suction chamber connected to the heating section and an inlet connected to the condensate returning outlet, and the apparatus further comprises a valve means provided at a connection between the heating section and the suction chamber of the steam ejector.

That is to say, the ejector is incorporated in a high-pressure control fluid passage connected to the condensate returning outlet of the condensate recovering unit and the suction chamber of the ejector and the heating section are connected to each other via the valve means comprising e.g. a shutoff valve. In operation, when the high-pressure control fluid is introduced from the condensate pressure-transporting passage thereby to pass the condensate through the ejector, a suction force is developed in the suction chamber of the ejector, whereby air accumulated inside the heating section may by sucked and exhausted via the valve means.

During both the initial stage of the heating process and the subsequent heating stage of the same, a suction force is developed in the ejector every time the condensate is pressure-transported from the condensate pressure-transporting passage of the condensate recovering unit, whereby air accumulated inside the heating section may be sucked and exhausted.

Further, with the steam-heating apparatus of the present invention, in addition to the above-described construction, the valve means comprises a temperature-responsive valve which is opened in response to a drop in the temperature by a predetermined value in the heating section or between the heating section or the condensate recovering unit so as to allow suction of air from the heating section into the suction chamber of the ejector.

That is to say, when the temperature in the heating section or between the heating section and the condensate recovering unit, such as in the condensate tank, drops by a predetermined value, the temperature-responsive valve as the valve means is opened to establish communication between the heating section and the suction chamber of the steam ejector, so that the resultant suction force developed in the suction chamber sucks and exhausts the air accumulated inside the heating section to the outside.

BEST MODE OF EMBODYING THE INVENTION

First Mode of Embodiment

A first mode of embodiment of a steam-heating apparatus will be described with reference to FIG. 1 in which a reaction vessel 1 is employed as a heat exchanger.

Figure 1:
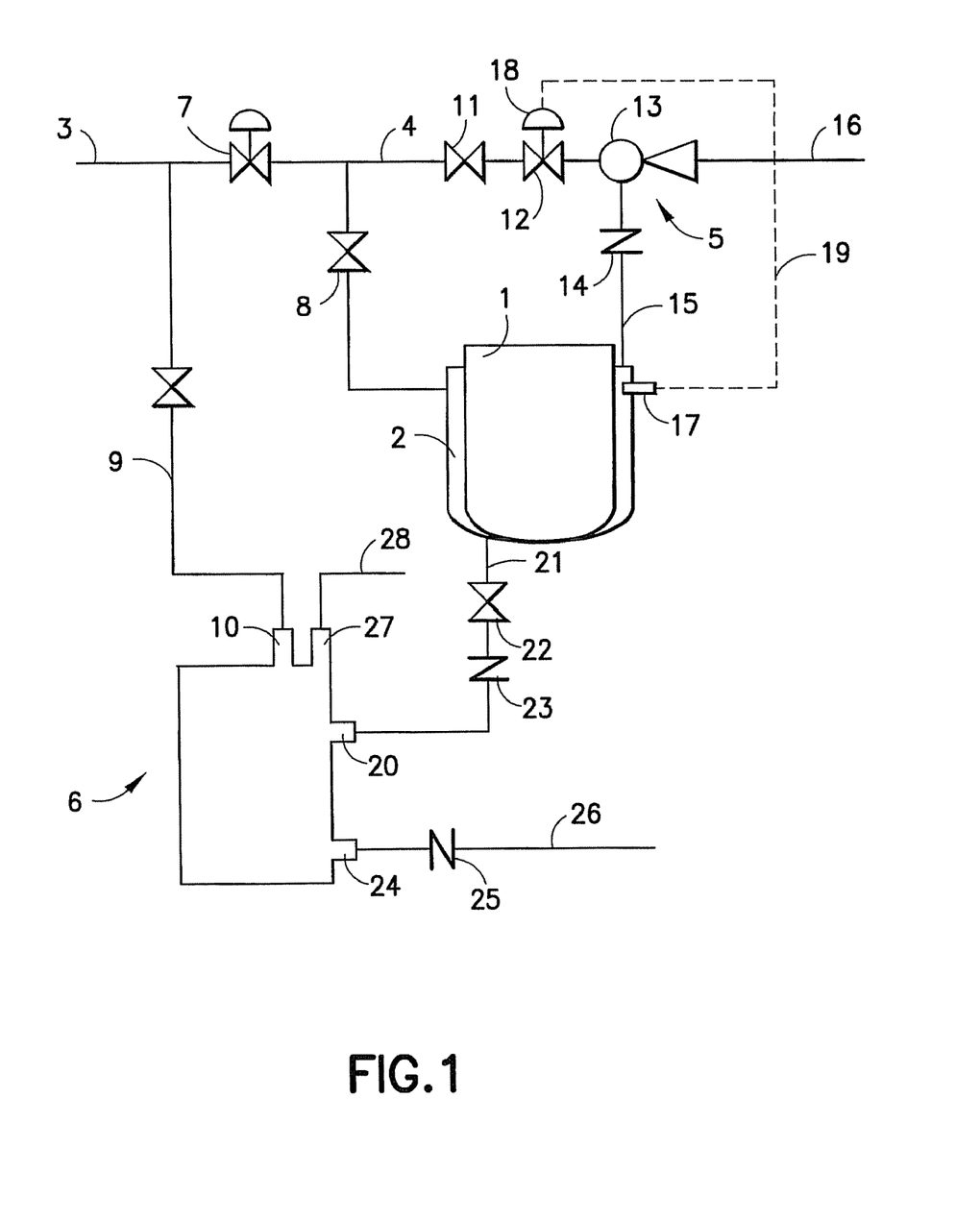
FIG. 1 is a construction view showing a first mode of embodiment of a steam-heating apparatus according to the present invention.

In the steam-heating apparatus shown in FIG. 1, a jacket section 2 formed as a heating section in the outer periphery of the reaction vessel 1 is connected to a steam supply pipe 3. Further, the apparatus includes a temperature-responsive valve 12 connected to a branch steam supply pipe 4 and a condensate recovering unit 6 disposed downwardly of the jacket section 2.

The steam supply pipe 3 incorporates a pressure control valve 7 and a shutoff valve 8 and is connected to the jacket section 2. The pressure control valve 7 sets the pressure of steam to be supplied to the jacket section 2 so that its temperature becomes a predetermined value. Further, the steam supply pipe 3 is connected via a pipe line 9 to a high-pressure control fluid inlet 10 of the condensate recovering unit 6.

The branch steam supply pipe 4 is connected via a shutoff valve 11 and the temperature-responsive valve 12 to an inlet of a steam ejector 5. The steam ejector 5 includes a suction chamber 13 which is communicated with the jacket section 2 via a pipe line 15 incorporating a check valve 14 therein. This check valve 14 allows only unidirectional passage of fluid from the jacket section 2 to the suction chamber 13, not allowing fluid passage in the reverse direction. An outlet of the steam ejector 5 is connected to a pipe line 16 to be communicated with a separately provided steam-using portion not shown.

In this embodiment, the temperature-responsive valve 12 is constructed as a self-actuated temperature control valve including a temperature-responsive cylinder 17 mounted to a portion of the jacket section 2 where accumulation of air tends to occur and an actuator portion 18 of the temperature-responsive valve 12, the cylinder 17 and the actuator portion 18 being connected to each other via a flexible tube 19. That is, the temperature-responsive valve 12 is opened when the temperature-responsive cylinder 17 detects a drop in the temperature inside the jacket section 2. More particularly, when the temperature inside the jacket section 2 drops, this results in reduction in the volume of a temperature-responsive fluid contained in the temperature-responsive cylinder 17, which reduction in turn results in pressure reduction in the temperature-responsive fluid due to its volume reduction. Then, the developed pressure reduction is transmitted via the flexible tube 19 to the actuator portion 18, whereby the temperature-responsive valve 12 is opened. Conversely, when the temperature inside the jacket section 2 rises, this temperature rise is detected by the temperature-responsive cylinder 17, whereby the temperature-responsive valve 12 is dosed.

As described above, with the temperature-responsive valve 12 provided at the connection between the steam supply pipe 4 and the inlet of the ejector 5 and the check valve 14 provided at the connection between the jacket section 2 and the suction chamber 13 of the steam ejector 5, when air is accumulated inside the jacket section 2 thereby to develop a corresponding drop in the temperature by a predetermined value, steam is supplied to the steam ejector 5, so that the resultant suction force developed in the suction chamber 13 sucks the air accumulated inside the jacket section 2 and exhausts this air to the outside.

A lower portion of the jacket section 2 is connected with a condensate inlet 20 of the condensate recovering unit 6 via a pipe line 21 which incorporates therein a valve 22 and a check valve 23. The check valve 23 allows only unidirectional passage of fluid from the jacket section 2 to the condensate recovering unit 6, not allowing fluid passage in the reverse direction. A condensate pressure-transporting pipe 26 is attached also via a check valve 25 to a condensate returning outlet 24 of the condensate recovering unit 6. This check valve 25 allows only unidirectional fluid passage from the condensate recovering unit 6 to the condensate pressure-transporting pipe 26, not allowing fluid passage in the reverse direction.

The condensate recovering unit 6 further includes an exhaust returning outlet 27 for the high-pressure control fluid disposed at the upper portion of the unit beside the high-pressure control fluid inlet 10, and this exhaust returning outlet 27 is connected to a pipe line 28, which in turn is connected to an unillustrated header or any other portion which has a lower pressure than another jacket section 2 provided separately.

When an unillustrated float contained in the unit 6 is located at a lower position, the condensate recovering unit 6 doses the high-pressure control fluid inlet 10 and also opens the exhaust returning outlet 27, whereby condensate inside the jacket section 2 is caused to flow down into the recovering unit 6 via the pipe line 21, the check valve 23 and the condensate inlet 20. Then, when the condensate is gradually accumulated within the recovering unit 6 to push up the float to a predetermined upper position, the unit doses the exhaust returning outlet 27 and opens the high-pressure control fluid inlet 10, whereby high-pressure steam as a high-pressure control fluid is allowed into the condensate recovering unit 6 via the steam supply pipe 3 and the condensate inside the unit is pressure-transported via the condensate returning outlet 24, the check valve 25 and the pipe line 26 to a condensate recovering area, where the condensate is recovered.

When the water level inside the recovering unit 6 is lowered as a result of recovery of the condensate, the high-pressure control fluid inlet 10 is again dosed and the exhaust returning outlet 27 is opened, whereby the condensate is caused to flow down into the recovering unit 6 via the condensate inlet 20. With repetition of such operational cycle, the condensate recovering unit 6 can recover the condensate produced inside the jacket section 2.

In FIG. 1, when an object is to be heated inside the reaction vessel 1, first, steam in the steam supply pipe 3 is supplied via the pressure control valve 7 to the jacket section 2. Inside this jacket section 2, a certain amount of air remains initially, because of which the temperature thereof has been dropped. Accordingly, the temperature-responsive valve 12 is opened so as to supply the steam from the steam supply pipe 4 to the steam ejector 5. With this, there is developed a suction force inside the suction chamber 13 of the steam ejector 5, which suction force then sucks the remaining air of the jacket section 5 into the suction chamber 13 via the check valve 14 and exhausts this air to the outside. When the temperature inside the jacket section 2 reaches a predetermined value, the temperature-responsive valve 12 is closed to stop the suction, whereby the steam is supplied via the pressure control valve 7 to the jacket section 2 thereby to heat the reaction vessel 1.

After heating the reaction vessel 1, the steam is rendered into condensate, which flows through the pipe line 21 down into the condensate recovering unit 6. By supplying the heating steam having a predetermined pressure, i.e. a predetermined temperature, into the jacket section 2 from which the air has been eliminated, the reaction unit 1 is heated by the steam of the predetermined temperature. For instance, when steam having a pressure below the atmospheric pressure and 60° C. is supplied via the pressure control valve 7, the reaction vessel 1 is heated at 60° C.

When the inside of the jacket section 2 is set at such pressure below the atmospheric pressure, the atmospheric pressure may act on the respective connections, so that a portion of atmospheric air may enter the jacket section 2 and this air or air mixed in the supplied steam may cause accumulation of air inside the jacket section 2, whereby the temperature of the jacket section 2 may be reduced due to heat discharge. Then, this temperature drop is detected by the temperature-responsive cylinder 17 to open the temperature-responsive valve 12, whereby steam is supplied from the steam supply pipe 4 into the steam ejector 5 and a suction force is developed in the suction chamber 13 of the steam ejector 5. As a result, the air remaining in the jacket section 2 is sucked via the check valve 14 into the suction chamber. 13 and exhausted to the outside. In this way, according to the present embodiment, not only air present in the initial state of the steam-heating apparatus but also air accumulated during the subsequent heating process may be sucked and exhausted to the outside by the steam ejector 5.

The steam having heated the reaction vessel 1 is condensed and rendered into the condensate, whereby its specific volume is reduced significantly, so that the inside of the jacket section 2 is maintained at the initial pressure condition. On the other hand, the condensed condensate flows down into the condensate recovering unit 6. And, with repetition of the operations described above, the condensate is pressure-transported to the condensate recovering portion.

Second Mode of Embodiment

A second mode of embodiment of a steam-heating apparatus will be described with reference to FIG. 2 in which a reaction vessel 1 is employed as a heat exchanger.

In the following discussion, the same construction as that of the foregoing embodiment will be omitted.

Figure 2:
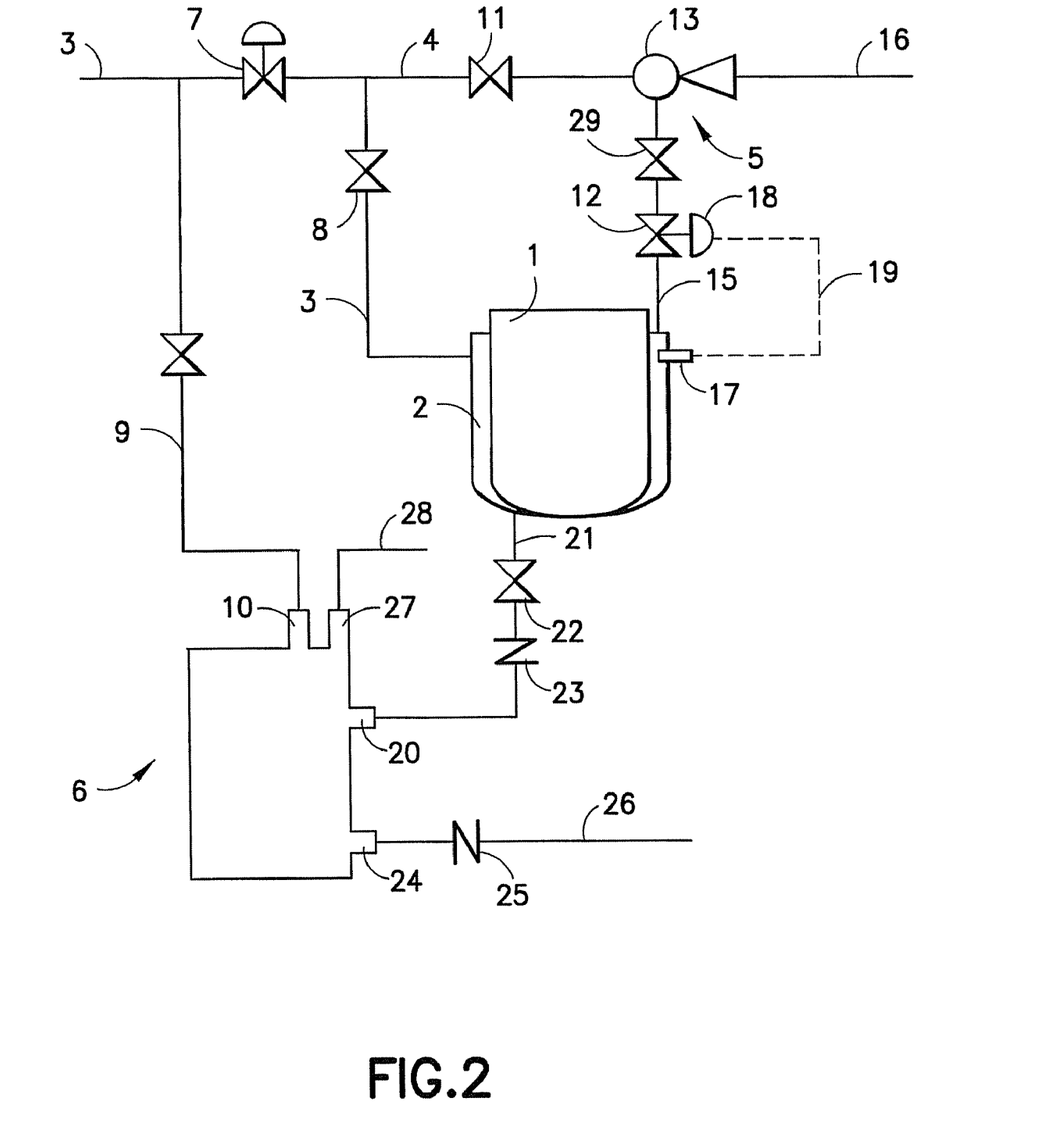
FIG. 2 is a construction view showing a second mode of embodiment of a steam-heating apparatus according to the present invention.

In the steam-heating apparatus shown in FIG. 2, a jacket section 2 formed as a heating section in the outer periphery of the reaction vessel 1 is connected to a steam supply pipe 3. Further, the apparatus includes a steam ejector 5 connected to a branch steam supply pipe 4, a temperature-responsive valve 12 provided a connection between a suction chamber 13 of the steam ejector 5 and the jacket section 2 and includes also a condensate recovering unit 6 disposed downwardly of the jacket section 2.

That is, the branch steam supply pipe 4 is connected via a shutoff valve 11 to an inlet of a steam ejector 5. The suction chamber 13 of the steam ejector 5 and the jacket section 2 are communicated with each other via a pipe line 15 incorporating a shutoff valve 29 and the temperature-responsive valve 12. An outlet of the steam ejector 5 is connected to a pipe line 16 to be communicated with a separately provided steam-using portion not shown.

In this embodiment, like the foregoing embodiment, the temperature-responsive valve 12 is constructed as a self-actuated temperature control valve.

As described above, with the temperature-responsive valve 12 provided at the connection between the jacket section 2 and the suction chamber 13 of the steam ejector 5 and the shutoff valve 11 for supplying steam to the steam ejector 5, when air is accumulated inside the jacket section 2 thereby to develop a corresponding drop in the temperature by a predetermined value, steam is supplied to the steam ejector 5, so that the resultant suction force developed in the suction chamber 13 sucks the air accumulated inside the jacket section 2 and exhausts this air to the outside.

In FIG. 2, when an object is to be heated inside the reaction vessel 1, first, steam in the steam supply pipe 3 is supplied via the pressure control valve 7 to the jacket section 2. Inside this jacket section 2, a certain amount of air remains initially, because of which the temperature thereof has been dropped. Accordingly, the temperature-responsive valve 12 is opened so as to establish communication between the suction chamber 13 of the steam ejector 5 and the jacket section 2 so that the air remaining inside the jacket section 2 is sucked into the suction chamber 13 to be exhausted to the outside. When the temperature inside the jacket section 2 reaches a predetermined value, the temperature-responsive valve 12 is closed to stop the suction, whereby the steam is supplied via the pressure control valve 7 to the jacket section 2 thereby to heat the reaction vessel 1. Incidentally, it is conceivable to adapt the pressure control valve 7 to be normally open so as to supply steam to the steam ejector 5. Instead, it is also conceivable to arrange that the valve is opened/closed in operative association with the temperature-responsive valve 12, whereby the valve is opened only when the air remaining in the jacket section 2 is to be sucked into the suction chamber 13.

When the inside of the jacket section 2 is set at such pressure below the atmospheric pressure, the atmospheric pressure may act on the respective connections, so that a portion of atmospheric air may enter the jacket section 2 and this air or air mixed in the supplied steam may cause accumulation of air inside the jacket section 2, whereby the temperature of the jacket section 2 may be reduced due to heat discharge. Then, this temperature drop is detected by the temperature-responsive cylinder 17 to open the temperature-responsive valve 12, whereby communication is established between the suction chamber 13 of the steam ejector 5 and the jacket section 2. As a result, the air remaining in the jacket section 2 is sucked into the suction chamber 13 and exhausted to the outside. In this way, according to the present embodiment, not only air present in the initial state of the steam-heating apparatus but also air accumulated during the subsequent heating process may be sucked and exhausted to the outside by the steam ejector 5.

In the steam-heating apparatus of both the first and second modes of embodiment, the steam supply pipe 4 for supplying steam to the inlet of the steam ejector 5 is connected to a portion of the steam supply pipe 3 for supplying steam to the inlet of the steam ejector 5 downstream of the pressure control valve 7. Alternatively, the steam supply pipe 4 may be connected to a portion upstream of the pressure control valve 7. In such case, it is possible to supply to the steam ejector 5 a high-pressure steam prior to its pressure adjustment. Still alternatively, in the steam-heating apparatus of the invention, the steam supply pipe 4 may be provided separately from the steam supply pipe 3, so that steam is supplied separately to the respective steam supply pipes 3, 4.

Third Mode of Embodiment

A third mode of embodiment of a steam-heating apparatus will be described with reference to FIG. 3 in which a reaction vessel 1 is employed as a heat exchanger.

In the following discussion, the same construction as that of the foregoing embodiment will be omitted.

Figure 3A:
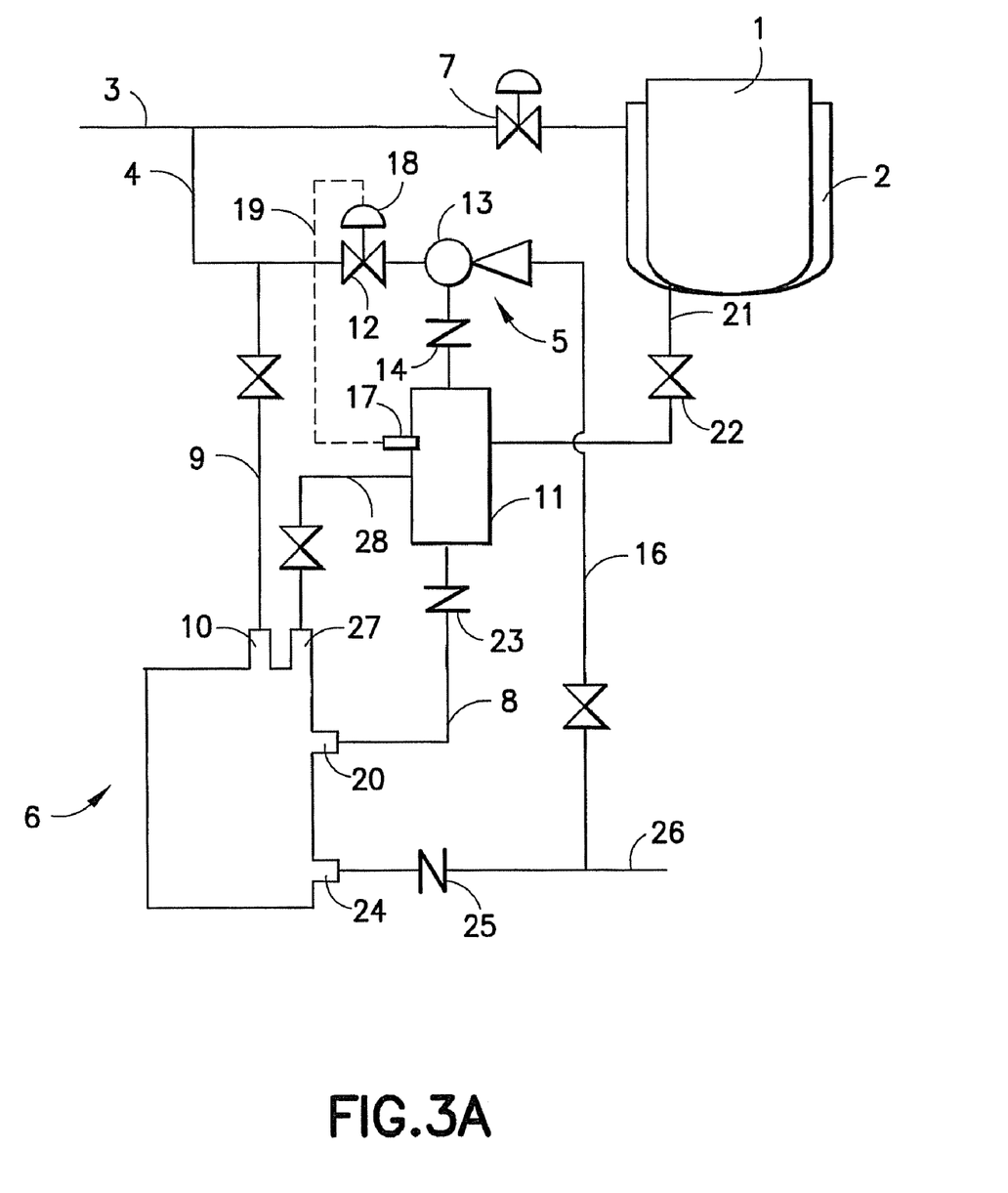
FIG. 3A is a construction view showing a third mode of embodiment of a steam-heating apparatus according to the present invention.
Figure 3B:
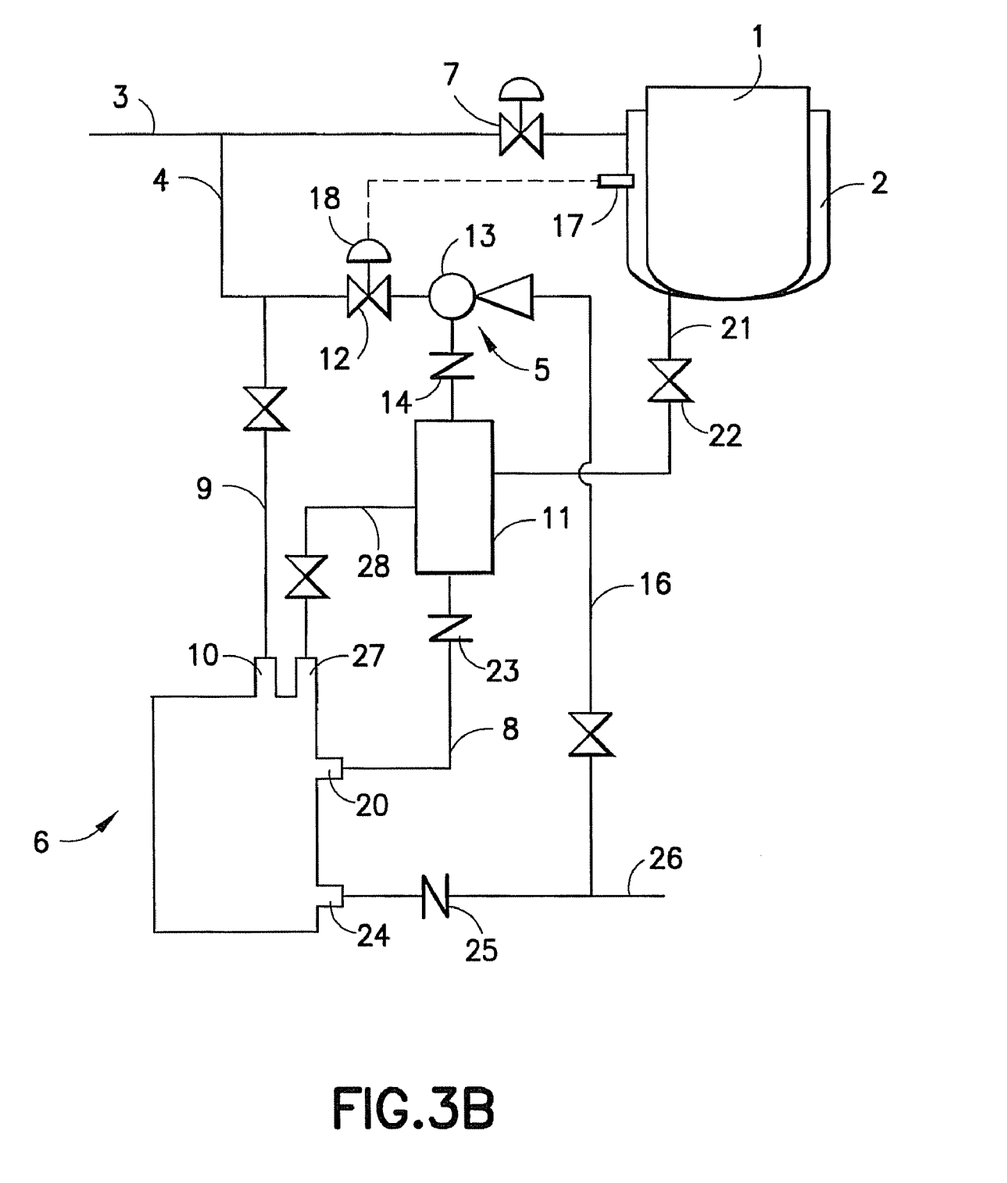
FIG. 3B is a construction showing the third mode of embodiment of a steam-heating apparatus according to the present invention with a modified piping arrangement.

In the steam-heating apparatus shown in FIG. 3, a jacket section 2 formed as a heating section in the outer periphery of the reaction vessel 1 is connected to a steam supply pipe 3. Further, the apparatus includes a temperature-responsive valve 12 connected to a branch steam supply pipe 4, a steam ejector 5, a condensate tank 11 disposed downwardly of the jacket section 2 and a condensate recovering unit 6.

The steam supply pipe 3 incorporates a pressure control valve 7 for setting the pressure of steam to be supplied to the jacket section 2 so that its temperature becomes a predetermined value. And, this pipe 3 is connected to the jacket section 2. Further, the steam supply pipe 3 is connected via a pipe line 9 branched from the branch steam supply pipe 4 to a high-pressure control fluid inlet 10 of the condensate recovering unit 6.

The branch steam supply pipe 4 is connected via the pressure-responsive valve 12 to an inlet of the steam ejector 5. A suction chamber 13 of the steam ejector 5 and an upper portion of the condensate tank 11 are communicated with each other via a check valve 14. This check valve 14 allows only unidirectional fluid passage from the condensate tank 11 to the suction chamber 13, not allowing fluid passage in the reverse direction. An outlet of the steam ejector 5 is connected to a pipe line 16 and communicated with a condensate pressure-transporting pipe line 26 described later.

In this embodiment, like the foregoing embodiments, the temperature-responsive valve 12 is constructed as a self-actuated temperature control valve. However, the temperature-responsive cylinder 17 of this temperature-responsive valve 12 is mounted to a portion of the condensate tank 11 where air tends to be accumulated. That is, the temperature-responsive valve 12 is opened when the temperature-responsive cylinder 17 detects a temperature drop inside the condensate tank 11.

As described above, with the temperature-responsive valve 12 provided at the connection between the steam supply pipe 4 and the inlet of the ejector 5 and the check valve 14 provided at the connection between the condensate tank 11 and the suction chamber 13 of the steam ejector 5, when air is accumulated inside the condensate tank 11 thereby to develop a corresponding drop in the temperature by a predetermined value, steam is supplied to the steam ejector 5, so that the resultant suction force developed in the suction chamber 13 sucks the air accumulated inside the condensate tank 11 and the jacket section 2 and exhausts this air to the outside.

In this embodiment, the temperature-responsive cylinder 17 of the temperature-responsive valve 12 is attached to the upper portion of the condensate tank 11. Instead, the temperature-responsive cylinder 17 may also be attached to an upper or lower portion of the jacket section 2 or may even be mounted inside the reaction vessel 1.

The lower portion of the jacket section 2 and a lateral portion of the condensate tank 11 are connected by a pipe line 21 via a valve 22. Further, the lower portion of the condensate tank 11 and the condensate inlet 20 of the condensate recovering unit 6 are connected by a pipe line 8 via a check valve 23. This check valve 23 allows only unidirectional fluid passage from the condensate tank 11 to the condensate recovering unit 6, not allowing fluid passage in the reverse direction. A condensate pressure-transporting pipe 26 is attached also via a check valve 25 to a condensate returning outlet 24 of the condensate recovering unit 6. This check valve 25 allows only unidirectional fluid passage from the condensate recovering unit 6 to the condensate pressure-transporting pipe 26, not allowing fluid passage in the reverse direction.

The condensate recovering unit 6 further includes an exhaust returning outlet 27 for the high-pressure control fluid disposed at the upper portion of the unit beside the high-pressure control fluid inlet 10, and this exhaust returning outlet 27 is connected to a pipe line 28, which in turn is connected to the inside of the condensate tank 11 which has a substantially same pressure as the jacket section 2.

When an unillustrated float contained in the unit 6 is located at a lower position, the condensate recovering unit 6 doses the high-pressure control fluid inlet 10 and also opens the exhaust returning outlet 27, whereby condensate inside the condensate tank 11 is caused to flow down into the recovering unit 6 via the pipe line 8, the check valve 23 and the condensate inlet 20. Then, when the condensate is gradually accumulated within the recovering unit 6 to push up the float to a predetermined upper position, the unit doses the exhaust returning outlet 27 and opens the high-pressure control fluid inlet 10, whereby high-pressure steam as a high-pressure control fluid is allowed into the unit 6 via the steam supply pipe 3 and the condensate inside the unit is pressure-transported via the condensate returning outlet 24, the check valve 25 and the pipe-line 26 to a condensate recovering area, where the condensate is recovered.

When the water level inside the recovering unit 6 is lowered as a result of recovery of the condensate, the high-pressure control fluid inlet 10 is again dosed and the exhaust returning outlet 27 is opened, whereby the condensate is caused to flow down into the recovering unit 6 via the condensate inlet 20. With repetition of such operational cycle, the condensate recovering unit 6 can recover the condensate produced inside the jacket section 2 via the condensate tank 11.

In FIG. 3, when an object is to be heated inside the reaction vessel 1, first, steam in the steam supply pipe 3 is supplied via the pressure control valve 7 to the jacket section 2. Inside this jacket section 2, a certain amount of air remains initially and also air has entered also from the jacket section 2 as being pushed by the steam, because of which the temperature thereof has been dropped. Accordingly, the temperature-responsive valve 12 is opened so as to establish communication between suction chamber 13 of the steam ejector 5 and the condensate tank 11, so that the air remaining in the condensate tank 11 is sucked via the check valve 14 into the suction chamber 13 of the steam ejector 5 and exhausted to the outside. When the temperature inside the condensate tank 11 and subsequently the temperature inside the jacket section 2 reaches a predetermined value, the temperature-responsive valve 12 is dosed to stop the suction, and on the other hand, the steam is supplied via the pressure control valve 7 to the jacket section 2 thereby to heat the reaction vessel 1.

After heating the reaction vessel 1, the steam is condensed and rendered into condensate, which flows through the pipe line 21 down into the condensate recovering unit 6 from the condensate tank 1. The pressure and the temperature of saturated steam have one-to-one relationship. Hence, by supplying the heating steam having a predetermined pressure, i.e. a predetermined temperature into the jacket section 2 from which the air has been eliminated, the reaction unit 1 is heated by the steam of the predetermined temperature. For instance, when steam having a pressure below the atmospheric pressure and 60° C. is supplied via the pressure control valve 7, the reaction vessel 1 is heated at 60° C.

When the inside of the jacket section 2 is set at such pressure below the atmospheric pressure, the atmospheric pressure may act on the respective connections, so that a portion of atmospheric air may enter the jacket section 2 and this air or air mixed in the supplied steam may cause accumulation of air inside the jacket section 2 and consequently inside the condensate tank 11 as well, whereby the temperature is reduced due to heat discharge by 5 to 10° C. from the saturation temperature. Then, this temperature drop is detected by the temperature-responsive cylinder 17 to open the temperature-responsive valve 12, whereby steam is supplied from the steam supply pipe 4 into the steam ejector 5 and a suction force is developed in the suction chamber 13 of the steam ejector 5. As a result, the air remaining in the condensate tank 11 is sucked via the check valve 14 into the suction chamber 13 and exhausted to the outside. In this way, according to the present embodiment, not only air present in the initial state of the steam-heating apparatus but also air accumulated during the subsequent heating process may be sucked and exhausted to the outside by the steam ejector 5.

The steam having heated the reaction vessel 1 is condensed and rendered into the condensate, whereby its specific volume is reduced significantly, so that the inside of the jacket section 2 is maintained at the initial pressure condition. On the other hand, the condensed condensate flows down from the condensate tank 11 into the condensate recovering unit 6. And, with repetition of the operations described above, the condensate is pressure-transported to the condensate recovering portion.

As described in the present embodiment, as the temperature-responsive valve 12 is opened/closed with detection of the temperature of the condensate tank 11, it becomes possible to provide the temperature-responsive valve 12, the ejector 5, the condensate tank 11 and the condensate recovering unit 6 as one integral unit. Then, by attaching this unit to a hot-water heating apparatus such as an existing reaction vessel 1 for replacement, the apparatus may be readily converted into a steam-heating apparatus.

Fourth Mode of Embodiment

A fourth mode of embodiment of a steam-heating apparatus will be described with reference to FIG. 4 in which a reaction vessel 1 is employed as a heat exchanger.

In the following discussion, the same construction as that of the foregoing embodiments will be omitted.

Figure 4:
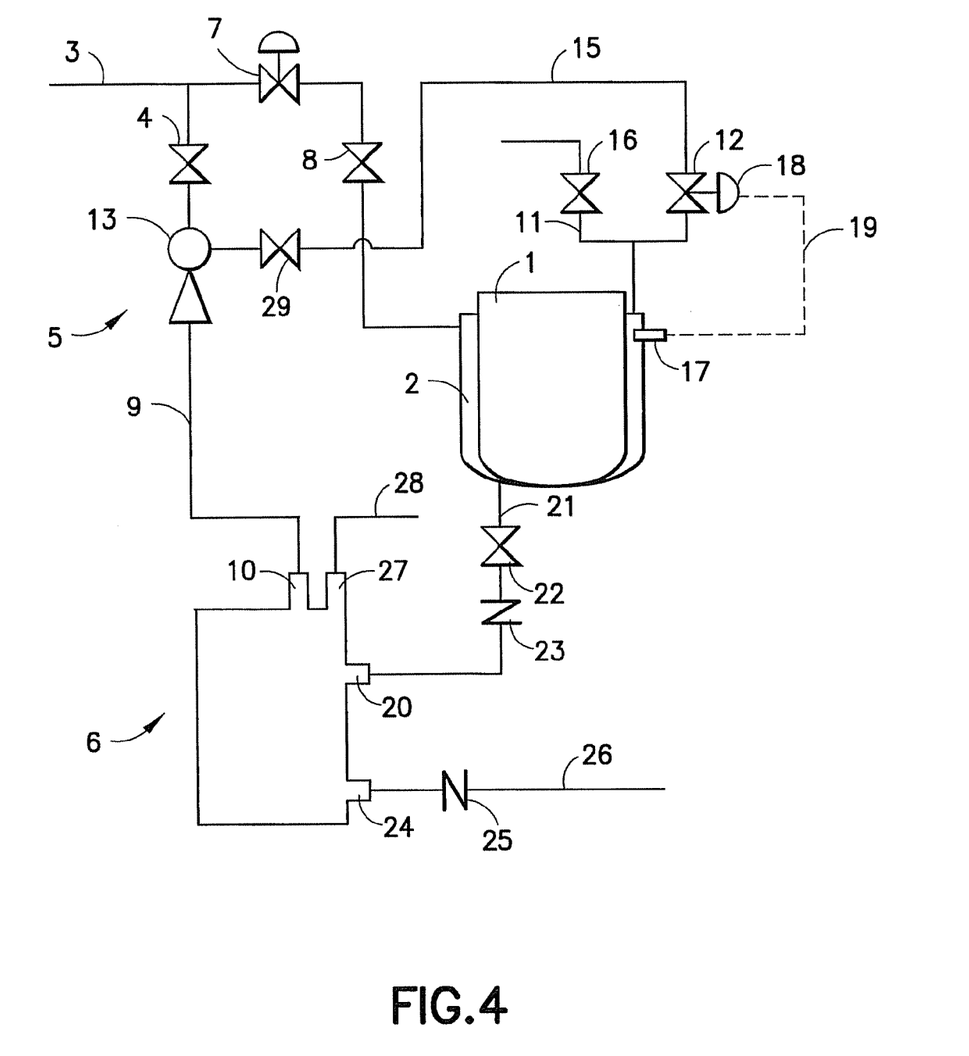
FIG. 4 is a construction view showing a fourth mode of embodiment of a steam-heating apparatus according to the present invention.

In the steam-heating apparatus shown in FIG. 4, a jacket section 2 formed as a heating section in the outer periphery of the reaction vessel 1 is connected to a steam supply pipe 3. Further, the steam supply pipe 3 is connected via a pipe line 9 to a high-pressure control fluid inlet 10 of a condensate recovering unit 6. The pipe line 9 incorporates an ejector 5 and a suction-chamber 13 of the ejector 5 and the jacket section 2 are connected with each other via a pipe line 15.

The steam supply pipe 3 incorporates a pressure control valve 7 for setting the pressure of steam to be supplied to the jacket section 2 so that its temperature becomes a predetermined value. And, this pipe 3 is connected to the jacket section 2.

The branch pipe line 9 is connected via a shutoff valve 4 to the ejector 5. An outlet of the ejector 5 is connected to a high-pressure control fluid inlet 10 of the condensate recovering unit 6. The suction chamber 13 of the ejector 5 and the jacket section 2 are communicated by a pipe line 15 via a shutoff valve 29 and a temperature-responsive valve 12. In this embodiment, the shutoff valve 29 and the temperature-responsive valve 12 together constitute a valve means.

In this embodiment, like the foregoing embodiments, the temperature-responsive valve 12 is constructed as a self-actuated temperature control valve including a temperature-responsive cylinder 17 mounted to a portion of the jacket section 2 where accumulation of air tends to occur and an actuator portion 18 of the temperature-responsive valve 12, the cylinder 17 and the actuator portion 18 being connected to each other via a flexible tube 19.

Like the foregoing embodiments, the condensate recovering unit 6 doses the high-pressure control fluid inlet 10 and also opens the exhaust returning outlet 27 when an unillustrated float contained in the unit 6 is located at a lower position, whereby condensate inside the jacket section 2 is caused to flow down into the recovering unit 6 via the pipe line 21, the check valve 23 and the condensate inlet 20. Then, when the condensate is gradually accumulated within the recovering unit 6 to push up the float to a predetermined upper position, the unit doses the exhaust returning outlet 27 and opens the high-pressure control fluid inlet 10, whereby high-pressure steam as a high-pressure control fluid is allowed into the unit 6 via the steam supply pipe 3 and the condensate contained therein is pressure-transported via the condensate returning outlet 24, the check valve 25 and the pipe line 26 to a condensate recovering area, where the condensate is recovered.

And, each time the high-pressure steam as a high-pressure control fluid is supplied from the inlet 10 into the condensate recovering unit 6, the high-pressure steam is caused to pass also the ejector 5, whereby a suction force can be developed in the suction chamber 13. Also, when the inlet 10 is closed, the high-pressure steam is not caused to pass the ejector 5, so that no suction force is developed, either.

In FIG. 4, when an object is to be heated inside the reaction vessel 1, first, steam in the steam supply pipe 3 is supplied via the pressure control valve 7 to the jacket section 2. In the case of this embodiment, since the pipe line 15 includes a branch pipe 11 and a shutoff valve 16, the remaining air initially present inside the jacket section 2 may be exhausted by opening the shutoff valve 16. That is to say, by supplying steam via the pressure control valve 7 to the jacket section 2 and also opening the shutoff valve 16, the air remaining inside the jacket section 2 is forced out by means of the steam.

Further, when some air remains inside the jacket section 2, the temperature inside the jacket section 2 has dropped. Hence, the temperature-responsive valve 12 is opened so as to establish communication between suction chamber 13 of the steam ejector 5 and the jacket section 2. So that, with each development of suction force inside the suction chamber 13 of the ejector 5, the remaining air inside the jacket section 2 is sucked and exhausted to the outside. When the temperature inside the jacket section 2 reaches a predetermined value, the temperature-responsive valve 12 is closed to stop the suction.

After heating the reaction vessel 1, the steam is condensed and rendered into condensate, which flows through the pipe line 21 down into the condensate recovering unit 6. By supplying the heating steam having a predetermined pressure, i.e. a predetermined temperature into the jacket section 2 from which the air has been eliminated, the reaction unit 1 is heated by the steam of the predetermined temperature. For instance, when steam having a pressure below the atmospheric pressure and 60° C. is supplied via the pressure control valve 7, the reaction vessel 1 is heated at 60° C.

When the inside of the jacket section 2 is set at such pressure below the atmospheric pressure, the atmospheric pressure may act on the respective connections, so that a portion of atmospheric air may enter the jacket section 2 and this air or air mixed in the supplied steam may cause accumulation of air inside the jacket section, whereby the temperature is reduced due to heat discharge. Then, this temperature drop is detected by the temperature-responsive cylinder 17 to open the temperature-responsive valve 12 thereby to establish communication between the suction chamber 13 of the ejector 5 and the jacket section 2. Then, with each resultant development of suction force inside the suction chamber 13 of the ejector 5, the air remaining in the jacket section 2 is sucked into the suction chamber 13 and exhausted to the outside. In this way, according to the present embodiment, with the valve means, not only air present in the initial state of the steam-heating apparatus but also air accumulated during the subsequent heating process may be sucked and exhausted to the outside by the steam ejector 5.

Fifth Mode of Embodiment

A fifth mode of embodiment of a steam-heating apparatus will be described with reference to FIG. 5 in which a reaction vessel 1 is employed as a heat exchanger.

In the following discussion, the same construction as that of the foregoing embodiment will be omitted.

Figure 5:
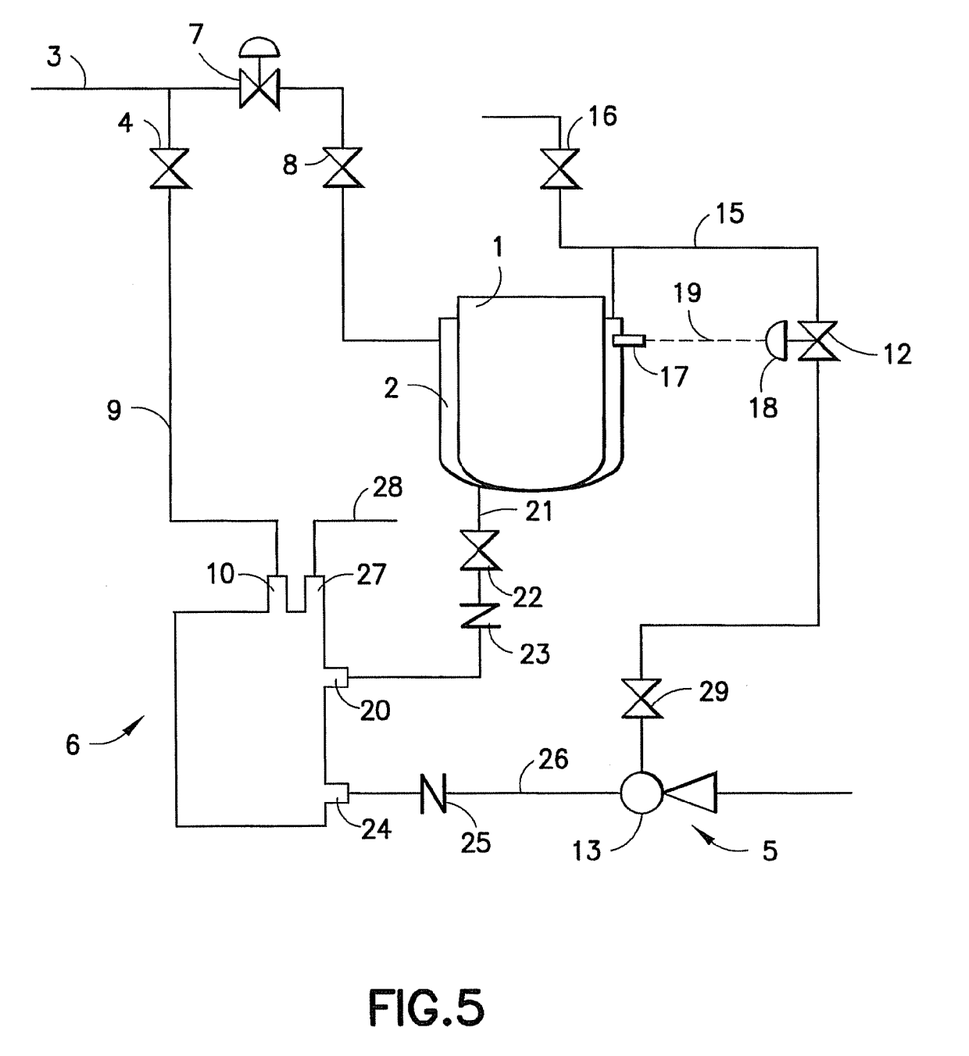
FIG. 5 is a construction view showing a fifth mode of embodiment of a steam-heating apparatus according to the present invention.

In the steam-heating apparatus shown in FIG. 5, a jacket section 2 formed as a heating section in the outer periphery of the reaction vessel 1 is connected to a steam supply pipe 3. Further, the steam supply pipe 3 is connected via a pipe line 9 to a high-pressure control fluid inlet 10 of a condensate recovering unit 6. The condensate recovering unit 6 includes a condensate retuning outlet 24, which in turn is connected to a condensate pressure-transporting pipe line 26 incorporating an ejector 5, and a suction chamber 13 of the ejector 5 and the jacket section 2 are connected with each other via a pipe line 15.

The condensate pressure-transporting pipe line 26 incorporates a check valve 25. This check valve 25 allows only unidirectional fluid passage from the condensate recovering unit 6 to the outside.

The condensate pressure-transporting pipe line 26 is connected to the ejector 5. The suction chamber 13 of the ejector 5 and the jacket section 2 are communicated with each other by a pipe line 15 incorporating a shutoff valve 29 and a temperature-responsive valve 12. In this embodiment, the shutoff valve 29 and the temperature-responsive valve 12 together constitute a valve means.

In this embodiment, like the foregoing embodiments, the temperature-responsive valve 12 is constructed as a self-actuated temperature control valve including a temperature-responsive cylinder 17 mounted to a portion of the jacket section 2 where accumulation of air tends to occur and an actuator portion 18 of the temperature-responsive valve 12, the cylinder 17 and the actuator portion 18 being connected to each other via a flexible tube 19.

Like the foregoing embodiments, the condensate recovering unit 6 doses the high-pressure control fluid inlet 10 and also opens the exhaust returning outlet 27 when an unillustrated float contained in the unit 6 is located at a lower position, whereby condensate inside the jacket section 2 is caused to flow down into the recovering unit 6 via the pipe line 21, the check valve 23 and the condensate inlet 20. Then, when the condensate is gradually accumulated within the recovering unit 6 to push up the float to a predetermined upper position, the unit closes the exhaust returning outlet 27 and opens the high-pressure control fluid inlet 10, whereby high-pressure steam as a high-pressure control fluid is allowed into the unit 6 via the steam supply pipe 3 and the condensate contained therein is pressure-transported via the condensate returning outlet 24, the check valve 25 and the pipe line 26 to a condensate recovering area, where the condensate is recovered.

And, each time the high-pressure steam as a high-pressure control fluid is supplied from the pipe line 26, the high-pressure steam is caused to pass also the ejector 5, whereby a suction force can be developed in the suction chamber 13.

In FIG. 5, when an object is to be heated inside the reaction vessel 1, first, steam in the steam supply pipe 3 is supplied via the pressure control valve 7 to the jacket section 2. In the case of this embodiment, since the pipe line 15 includes a branch pipe 11 and a shutoff valve 16, the remaining air initially present inside the jacket section 2 may be exhausted by opening the shutoff valve 16. That is to say, by supplying steam via the pressure control valve 7 to the jacket section 2 and also opening the shutoff valve 16, the air remaining inside the jacket section 2 is forced out by means of the steam.

Further, when some air remains inside the jacket section 2, the temperature inside the jacket section 2 has dropped. Hence, the temperature-responsive valve 12 is opened so as to establish communication between suction chamber 13 of the steam ejector 5 and the jacket section 2. So that, with each development of suction force inside the suction chamber 13 of the ejector 5, the remaining air inside the jacket section 2 is sucked and exhausted to the outside. When the temperature inside the jacket section 2 reaches a predetermined value, the temperature-responsive valve 12 is closed to stop the suction.

When the inside of the jacket section 2 is set at such pressure below the atmospheric pressure, the atmospheric pressure may act on the respective connections of the jacket section 2, so that a portion of atmospheric air may enter the jacket section 2 and this air or air mixed in the supplied steam may cause accumulation of air inside the jacket section 2, whereby the temperature is reduced due to heat discharge. Then, this temperature drop is detected by the temperature-responsive cylinder 17 to open the temperature-responsive valve 12 thereby to establish communication between the suction chamber 13 of the ejector 5 and the jacket section 2. Then, with each resultant development of suction force inside the suction chamber 13 of the ejector 5, the air remaining in the jacket section 2 is sucked into the suction chamber 13 and exhausted to the outside. In this way, according to the present embodiment, not with the valve means, only air present in the initial state of the steam-heating apparatus but also air accumulated during the subsequent heating process may be sucked and exhausted to the outside by the steam ejector 5.

In the fourth and fifth modes of embodiment described above, the valve means comprises the shutoff valve 29 and the temperature-responsive valve 12. Instead, the valve means may comprise only either the shutoff valve or the temperature-responsive valve. Further, it is also possible to employ a check valve which allows only unidirectional fluid passage from the jacket section 2 to the suction chamber 13, not allowing fluid passage in the reverse direction.

In the foregoing modes of embodiment, the temperature-responsive valve 12 is provided as a self-actuated type temperature-responsive valve including the temperature-responsive cylinder 17 and the actuator portion 18 connected to each other via the flexible tube 19. Instead, this temperature-responsive valve may comprise a combination of a temperature sensor or an oxygen sensor for detecting presence of air and a controller.

INDUSTRIAL APPLICABILITY

As described above, the steam-heating apparatus relating to the present invention heats an object placed in a heat exchanger by means of steam supplied into a heating section. And, this apparatus is useful as a steam-heating apparatus which allows heating the object with high temperature precision without adverse effect of e.g. temperature unevenness in the heating section by sucking and exhaust air accumulated inside the heating section as needed. This apparatus is particularly useful as a steam-heating apparatus suitable for a relatively low heating temperature ranging around 100° C. Specifically, the apparatus is suitable as a steam-heating apparatus for use in steam-heating of various reaction vessels employed for polymerzation reaction, etc., a distilling apparatus for food products, a condensing apparatus, or a sterilizer.

What is claimed is:

1. A steam-heating apparatus in which a heating section formed in a heat exchanger is connected to a steam supply pipe for receiving a supply of heating steam and connected also to a condensate recovering unit for discharging condensate produced as a result of heating, the apparatus comprising: a condensate tank disposed between the heating section and the condensate recovering unit; a steam ejector including a suction chamber connected to the condensate tank and an inlet for receiving supply of steam; a temperature sensor mounted to a portion of the heating section, for detecting temperature of the heating section; a means for operating the steam ejector based on the temperature detected by the temperature sensor; and wherein the means for operating actuate the steam ejector in response to a drop in the temperature of the heating section by a predetermined value to cause gas in the condensate tank to be sucked into the suction chamber of the steam ejector.

2. The steam-heating apparatus according to claim 1, further comprising a temperature-responsive valve provided at the inlet of the steam ejector, the temperature-responsive valve being opened in response to a drop in the temperature of the heating section by the predetermined value so as to supply the steam to the inlet of the steam ejector.

3. The steam-heating apparatus according to claim 2, further comprising a check valve provided at a connection between the condensate tank and the suction chamber of the steam ejector, the check valve allowing only unidirectional gas passage from the condensate tank to the suction chamber of the steam ejector.

* * * * *

UNITED STATES PATENT AND TRADEMARK OFFICE
CERTIFICATE OF CORRECTION

PATENT NO. : 7,316,205 B2 Page 1 of 1
APPLICATION NO. : 11/257908
DATED : January 8, 2008
INVENTOR(S) : Kumamoto It is certified that error appears in the above-identified patent and that said Letters Patent is hereby corrected as shown below:

Title Page of the Patent, See Item (56) References Cited, FOREIGN PATENT DOCUMENTS, The last document listed, "JP 11-318543 11/1999" should read -- JP 11-319543 11/1999 --

Signed and Sealed this

Third Day of June, 2008

JON W. DUDAS
*Director of the United States Patent and Trademark Office*